(12) United States Patent
Krishnamoorthy

(10) Patent No.: US 11,593,450 B2
(45) Date of Patent: Feb. 28, 2023

(54) SYSTEM FOR DYNAMIC GENERATION OF A TRANSMISSION INTERFACE BRIDGE FOR COMPUTING PLATFORMS

(71) Applicant: Bank of America Corporation, Charlotte, NC (US)

(72) Inventor: Madhusudhanan Krishnamoorthy, Chennai (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 229 days.

(21) Appl. No.: 16/886,994

(22) Filed: May 29, 2020

(65) Prior Publication Data

US 2021/0374207 A1 Dec. 2, 2021

(51) Int. Cl.
*G06F 16/957* (2019.01)
*G06F 3/04812* (2022.01)
*G06F 16/958* (2019.01)
*G06V 30/224* (2022.01)
*G06F 9/54* (2006.01)

(52) U.S. Cl.
CPC ...... *G06F 16/9577* (2019.01); *G06F 3/04812* (2013.01); *G06F 16/958* (2019.01); *G06V 30/224* (2022.01); *G06F 9/541* (2013.01)

(58) Field of Classification Search
CPC ............. G06F 16/9577; G06F 3/04812; G06F 16/958; G06F 9/541; G06V 30/224; G06V 30/10
See application file for complete search history.

(56) References Cited

U.S. PATENT DOCUMENTS

| 5,559,958 A | 9/1996 | Farrand et al. |
| 6,014,702 A * | 1/2000 | King .................. G06F 9/54 709/227 |
| 6,021,437 A | 2/2000 | Chen et al. |
| 7,764,682 B2 | 7/2010 | Sievert |

(Continued)

OTHER PUBLICATIONS

Xu, ("Graph convolutional networks: a comprehensive review", pp. 1-42 (Year: 2019).*

*Primary Examiner* — S. Sough
*Assistant Examiner* — Phuong N Hoang
(74) *Attorney, Agent, or Firm* — Moore & Van Allen PLLC; Anup Shrinivasan Iyer

(57) ABSTRACT

Systems, computer program products, and methods are described herein for system for dynamic generation of a transmission interface bridge for computing platforms. The present invention is configured to retrieve information associated with a first user interface associated with a first computing device; initiate a GCN algorithm on the first user interface; generate a graphical representation of the first user interface; transform the graphical representation of the first user interface into one or more code blocks associated with HTML and/or CSS; load the one or more code blocks on a cross-platform GUI platform logic; initiate an embedding of the cross-platform GUI platform with an emulator high level language application programming interface (EHLLAPI) to emulate the first user interface by superimposing the second user interface over the first user interface; transmit control signals configured to cause a second computing device to display, using the cross-platform GUI platform logic, the second user interface.

18 Claims, 3 Drawing Sheets

(56) References Cited

U.S. PATENT DOCUMENTS

| | | |
|---|---|---|
| 7,810,087 B2 | 10/2010 | OBrien |
| 7,961,594 B2 | 6/2011 | Alon et al. |
| 7,987,449 B1 | 7/2011 | Marolia et al. |
| 8,301,749 B1 | 10/2012 | Finklestein et al. |
| 8,365,144 B1* | 1/2013 | Webb ...................... G06F 3/048 |
| | | 709/227 |
| 8,443,066 B1 | 5/2013 | Saraiya et al. |
| 8,856,518 B2 | 10/2014 | Sridharan et al. |
| 8,886,783 B2 | 11/2014 | Johnsen et al. |
| 8,958,293 B1 | 2/2015 | Anderson |
| 8,989,187 B2 | 3/2015 | Saraiya et al. |
| 8,995,272 B2 | 3/2015 | Agarwal et al. |
| 9,183,106 B2 | 11/2015 | Rao et al. |
| 9,485,147 B2 | 11/2016 | Gu |
| 9,628,407 B2 | 4/2017 | Guntaka et al. |
| 9,740,516 B1 | 8/2017 | Petrescu-Prahova et al. |
| 9,825,900 B2 | 11/2017 | Kamath et al. |
| 2014/0035945 A1* | 2/2014 | Anglin ...................... G06F 3/14 |
| | | 345/619 |
| 2014/0092908 A1 | 4/2014 | Berman |
| 2014/0123020 A1* | 5/2014 | Bleier ...................... G06F 8/38 |
| | | 715/746 |
| 2015/0248298 A1 | 9/2015 | Gavrilov |
| 2018/0275971 A1* | 9/2018 | Parsolano, III ........... G06F 8/34 |
| 2019/0130094 A1* | 5/2019 | Votaw ................ H04L 63/0861 |
| 2019/0180746 A1* | 6/2019 | Diwan ................ G06F 40/279 |
| 2019/0304156 A1* | 10/2019 | Amer ................ G06N 3/0454 |
| 2020/0327772 A1* | 10/2020 | Babb ...................... G06F 9/547 |
| 2021/0103798 A1* | 4/2021 | Neagovici ................ G06N 3/08 |

\* cited by examiner

SYSTEM FOR DYNAMIC GENERATION OF A TRANSMISSION INTERFACE BRIDGE FOR COMPUTING PLATFORMS

FIELD OF THE INVENTION

The present invention embraces a system for dynamic generation of a transmission interface bridge for computing platforms.

BACKGROUND

Legacy environments (such as mainframe environment) include computing systems that are capable of handling and processing very large amounts of data very quickly. Most entities still use mainframe computing systems to process large amount of data efficiently. But analyzing this data by directly querying the mainframe computing system can be complex and resource heavy, with transactions being executed based on MIPS (millions of instructions per second). To meet evolving business needs, there is a need to leverage the processing capability of the mainframe computing systems while making their user interfaces accessible to modern computing platforms.

There is a need for a system for dynamic generation of a transmission interface bridge for computing platforms.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for system for dynamic generation of a transmission interface bridge for computing platforms is presented. The system comprising: at least one non-transitory storage device; and at least one processing device coupled to the at least one non-transitory storage device, wherein the at least one processing device is configured to: electronically retrieve information associated with a first user interface associated with a first computing device; initiate a Graph Convolution Network (GCN) algorithm on the first user interface; generate a graphical representation of the first user interface based on at least initiating the GCN algorithm on the first user interface; transform the graphical representation of the first user interface into one or more code blocks associated with Hypertext Mark-up Language (HTML) and/or Cascading Style Sheets (CSS); load the one or more code blocks on a cross-platform Graphical User Interface (GUI) platform logic, wherein loading further comprises mapping the first user interface into a second user interface; initiate an embedding of the cross-platform GUI platform with an emulator high level language application programming interface (EHLLAPI) to emulate the first user interface by superimposing the second user interface over the first user interface; transmit control signals configured to cause a second computing device to display, using the cross-platform GUI platform logic, the second user interface.

In some embodiments, the at least one processing device is further configured to: electronically receive one or more user inputs from a user via the second user interface displayed on the second computing device, wherein the one or more user inputs comprises at least keystroke input; convert, using the EHLLAPI, the one or more user inputs into one or more actions to be executed on the first computing device based on at least mapping the first user interface into the second user interface; and initiate an execution of the one or more actions on the first computing device.

In some embodiments, the at least one processing device is further configured to: electronically retrieve a Basic Mapping Support (BMS) map associated with the first user interface; initiate an Optical Character Recognition (OCR) engine on the first user interface and the BMS maps associated with the first user interface; and generate, using the OCR engine, an object map and a field position map for the first user interface based on at least the first user interface and the BMS maps associated with the first user interface.

In some embodiments, the at least one processing device is further configured to: initiate the GCN algorithm on the first user interface, wherein initiating further comprises initiating the GCN algorithm on the object map and the field position map associated with the first user interface.

In some embodiments, the at least one processing device is further configured to: generate the graphical representation of the first user interface based on at least initiating the GCN algorithm on the first user interface, wherein generating further comprises embedding hierarchical information associated with the object map and the field position map in the graphical representation.

In some embodiments, the at least one processing device is further configured to transform the graphical representation of the first user interface into one or more code blocks associated with HTML and/or CSS, wherein transforming further comprises: capturing one or more unique features associated with the first user interface from the graphical representation of the first user interface; and transforming the one or more unique features associated with the first user interface into one or more code blocks associated with HTML and/or CSS.

In some embodiments, the at least one processing device is further configured to: continuously monitor the first user interface to detect any changes to the object map and/or the field position map; detect one or more changes to the object map and/or the field position map associated with the first user interface; initiate the GCN algorithm on the first user interface with the one or more changes to the object map and/or the field position map associated with the first user interface; generate an updated graphical representation of the first user interface based on at least initiating the GCN algorithm on the first user interface with the one or more changes to the object map and/or the field position map, wherein generating further comprises embedding hierarchical information associated with the one or more changes to the object map and/or the field position map to the graphical representation; and update the one or more code blocks based on at least the updated graphical representation of the first user interface.

In some embodiments, the at least one processing device is further configured to: initiate a Robotic Process Automation (RPA) engine on the second user interface associated with the second computing device; deploy, using the RPA engine, an application execution bot to replicate the one or more user inputs to be executed on the second user interface; convert, using the EHLLAPI, the one or more user inputs executed by the application execution bot on the second user interface into the one or more actions to be executed on the first computing device based on at least mapping the first user interface into the second user interface; and initiate an execution of the one or more actions on the first computing device.

In another aspect, a computer program product for system for dynamic generation of a transmission interface bridge for computing platforms is presented. The computer program product comprising a non-transitory computer-readable medium comprising code causing a first apparatus to: electronically retrieve information associated with a first user interface associated with a first computing device; initiate a Graph Convolution Network (GCN) algorithm on the first user interface; generate a graphical representation of the first user interface based on at least initiating the GCN algorithm on the first user interface; transform the graphical representation of the first user interface into one or more code blocks associated with Hypertext Mark-up Language (HTML) and/or Cascading Style Sheets (CSS); load the one or more code blocks on a cross-platform Graphical User Interface (GUI) platform logic, wherein loading further comprises mapping the first user interface into a second user interface; initiate an embedding of the cross-platform GUI platform with an emulator high level language application programming interface (EHLLAPI) to emulate the first user interface by superimposing the second user interface over the first user interface; transmit control signals configured to cause a second computing device to display, using the cross-platform GUI platform logic, the second user interface.

In yet another aspect, a method system for dynamic generation of a transmission interface bridge for computing platforms is presented. The method comprising: electronically retrieving information associated with a first user interface associated with a first computing device; initiating a Graph Convolution Network (GCN) algorithm on the first user interface; generating a graphical representation of the first user interface based on at least initiating the GCN algorithm on the first user interface; transforming the graphical representation of the first user interface into one or more code blocks associated with Hypertext Mark-up Language (HTML) and/or Cascading Style Sheets (CSS); loading the one or more code blocks on a cross-platform Graphical User Interface (GUI) platform logic, wherein loading further comprises mapping the first user interface into a second user interface; initiating an embedding of the cross-platform GUI platform with an emulator high level language application programming interface (EHLLAPI) to emulate the first user interface by superimposing the second user interface over the first user interface; transmitting control signals configured to cause a second computing device to display, using the cross-platform GUI platform logic, the second user interface.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
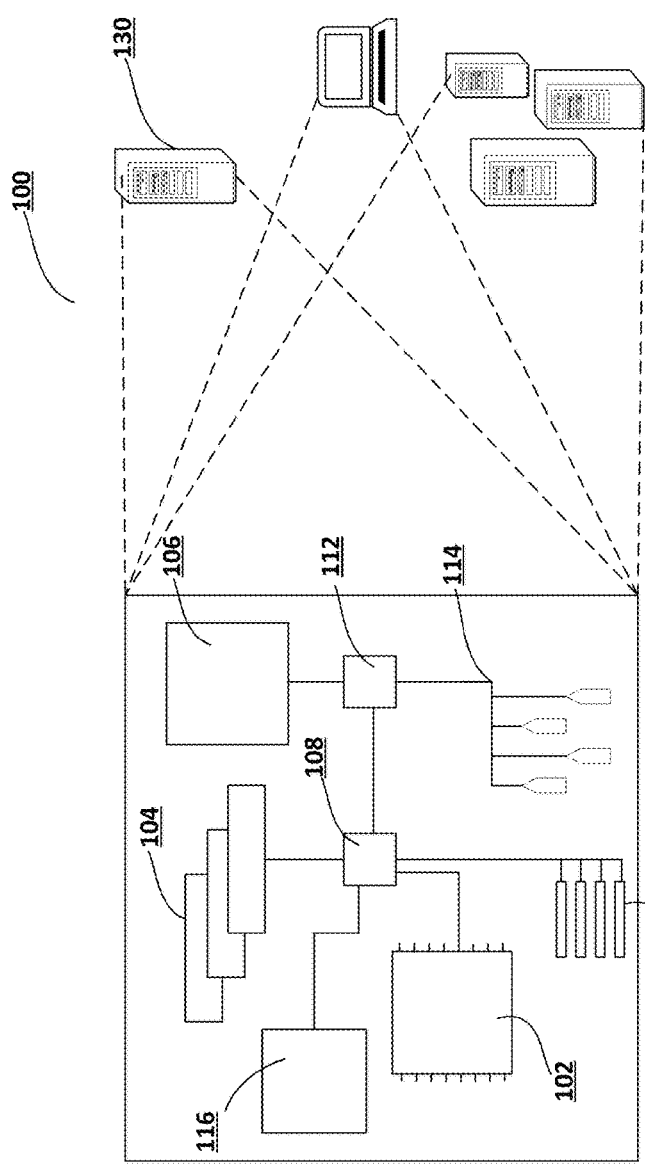
Figure 1:
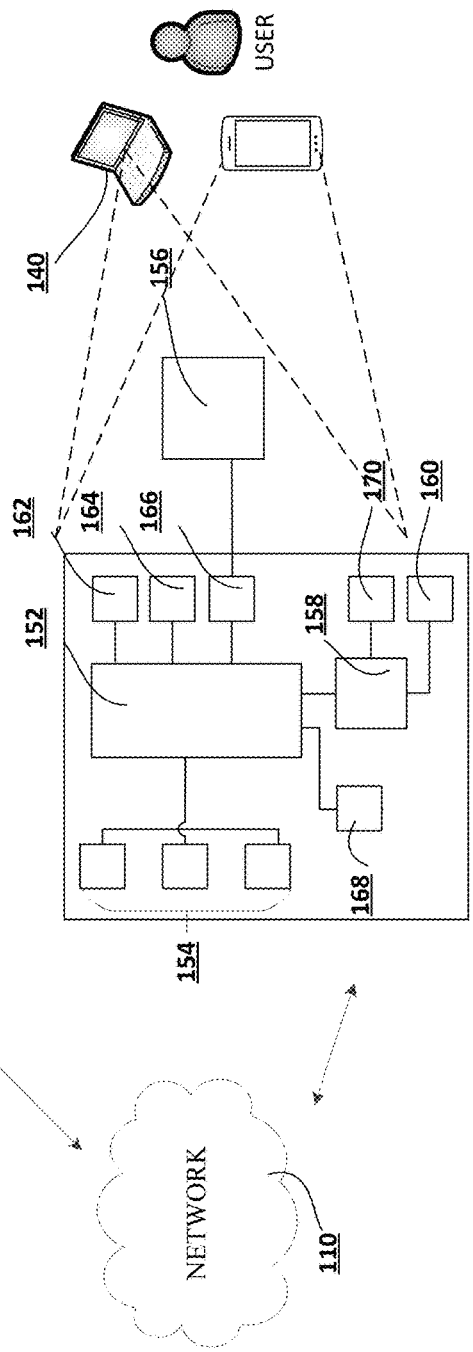
Figure 2:
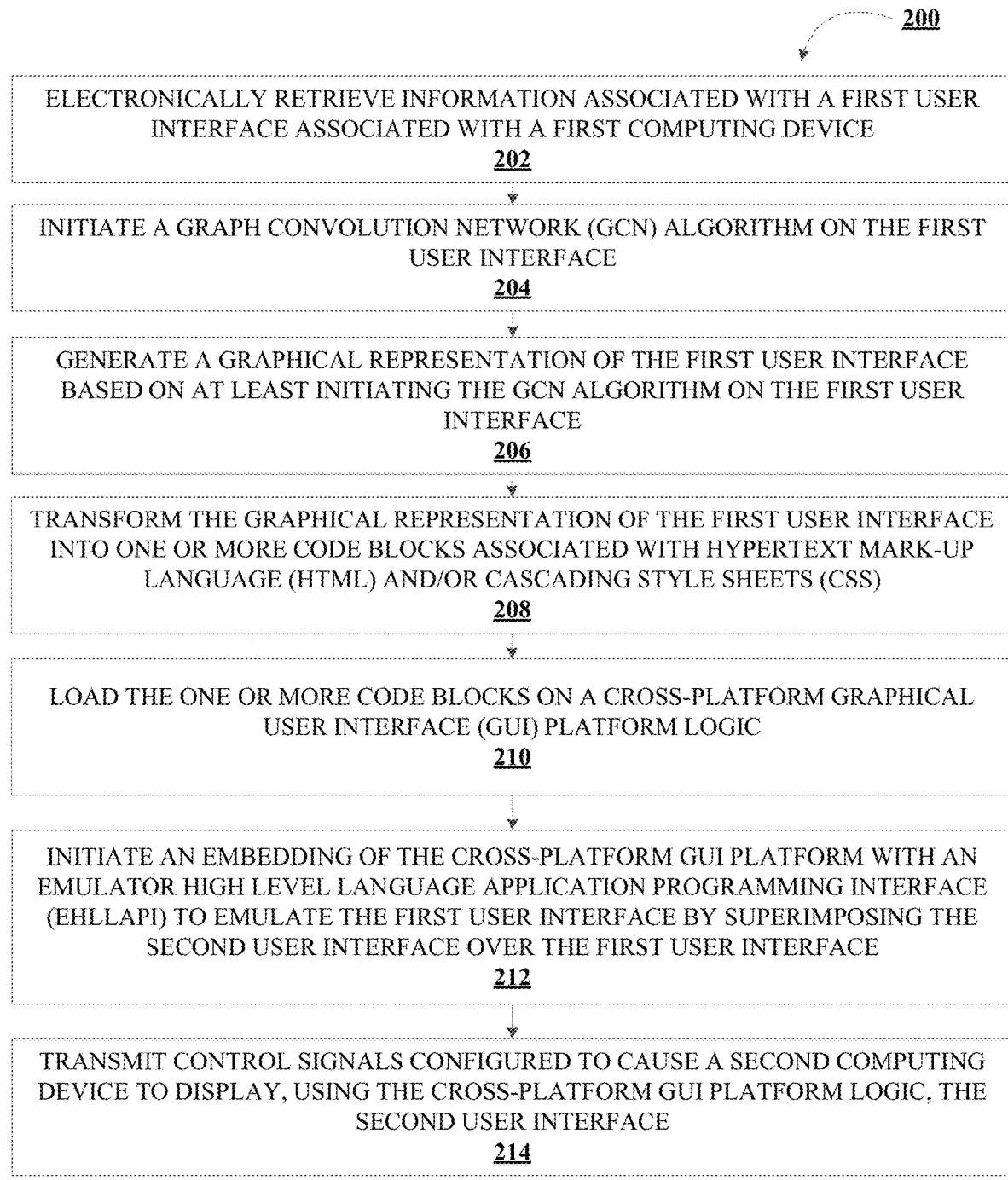
Figure 3:
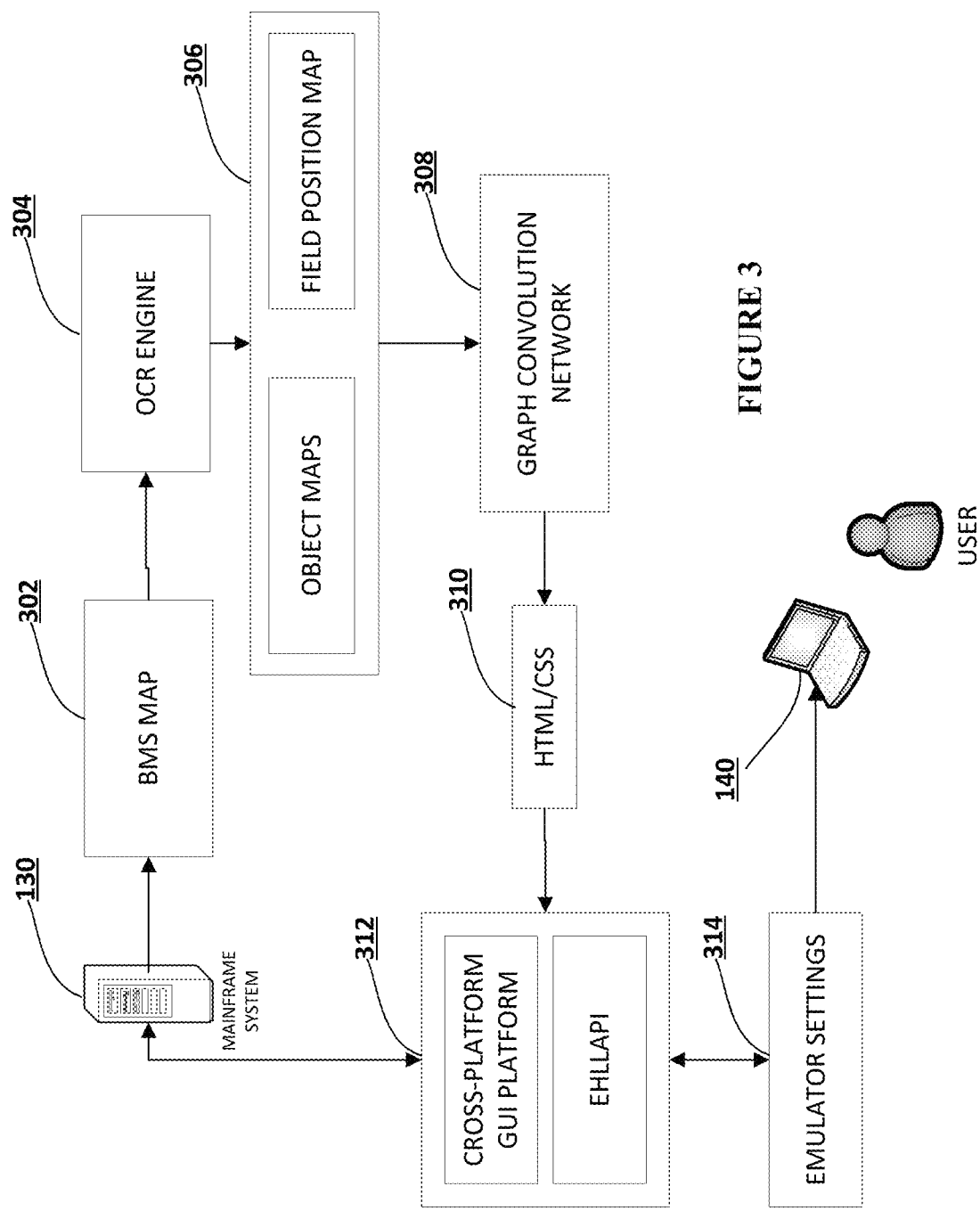

Having thus described embodiments of the invention in general terms, reference will now be made the accompanying drawings, wherein:

FIG. 1 illustrates technical components of a system for system for dynamic generation of a transmission interface bridge for computing platforms, in accordance with an embodiment of the invention;

FIG. 2 illustrates a process flow for system for dynamic generation of a transmission interface bridge for computing platforms, in accordance with an embodiment of the invention; and FIG. 3 illustrates a flowchart for dynamic generation of a transmission interface bridge for computing platforms, in accordance with an embodiment of the invention

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

FIG. 1 presents an exemplary block diagram of the system environment for system for dynamic generation of a transmission interface bridge for computing platforms 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and user interface 166 coupled to a display 156. The display 156 may be, for example, a TFT LCD (Thin-Film-Transistor Liquid Crystal Display) or an OLED (Organic Light Emitting Diode) display, or other appropriate display technology. The user interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Legacy environments (such as mainframe environment) include computing systems that are capable of handling and processing very large amounts of data very quickly. Most entities still use mainframe computing systems to process large amount of data efficiently. But analyzing this data by directly querying the mainframe computing system can be complex and resource heavy, with transactions being executed based on MIPS (millions of instructions per second). To meet evolving business needs, there is a need to leverage the processing capability of the mainframe computing systems while making their user interfaces accessible to modern computing platforms.

The present invention contemplates leveraging Graph Convolutional Networks (GCN) to extract features from the user interface of legacy computing systems. Once extracted, these features are transformed into Hypertext Mark-up Text (HTML) or Cascading Style Sheets (CSS) code. Most modern computing platforms are capable of executing HTML and CSS code thereon. By coding the features of the user interface of legacy computing systems, the present invention provides the functional benefit of dynamically generating a user interface on modern computing platforms. By superimposing the dynamically generated user interface with the user interface of legacy computing systems, the present invention provides the functional benefit of mapping keystrokes recorded in the dynamically generated user interface to actions to be executed on the legacy computing system. Having generated a dynamic user interface, the present invention contemplates the implementation of a Robotic Process Automation (RPA) engine to mimic the actions of a human being in order to perform a computer-based task via the dynamically generated user interface. Typically, RPA can be used to automate the execution of repetitive and manually intensive activities. To this extent, the RPA engine uses a configurable software set up referred to as "bots" to perform the assigned tasks for automation.

FIG. 2 illustrates a process flow for dynamic generation of a transmission interface bridge for computing platforms 100, in accordance with an embodiment of the invention. As shown in block 202, the process flow includes electronically retrieving information associated with a first user interface associated with a first computing device. In this regard, the system may be configured to electronically retrieve a Basic Mapping Support (BMS) map associated with the first user interface. Any application running on the first computing device may include a number of user interfaces, including the first user interface. The BMS may be configured to act as an interface between the first user interface and the OCR engine. Such a BMS map based interface may include the positions and attributes of one or more objects present in the first user interface.

In response, the system may be configured to initiate an Optical Character Recognition (OCR) engine on the first user interface and the BMS maps associated with the first user interface. In response, the system may be configured to generate, using the OCR engine, an object map and a field position map for the first user interface based on at least the first user interface and the BMS maps associated with the first user interface. In some embodiments, the object map may include the identifying information associated with each user interface element on the first user interface and the attribute associated with each user interface element. In some embodiments, the field position mapping may include information associated with the position of each user interface element relative to the other user interface elements. In one aspect, the field position map may include at least relationship information associated with each user interface element with each of the other user interface elements.

Next, as shown in block 204, the process flow includes initiating a Graph Convolution Network (GCN) algorithm on the first user interface. In this regard, the system may be configured to initiate the GCN algorithm on the object map and the field position map associated with the first user interface. GCN is a class of deep learning neural networks commonly used to analyze visual imagery in image classification. GCNs have an input layer, an output layer, and hidden layers. The hidden layers typically include convolutional layers, ReLU layers, pooling layers, and fully connected layers. GCN typically alternates between convolution and pooling layers. The convolution layers pass a filter over the source image and extract the important information from each piece. The pooling layers take the extracted information and down sample it to retain only the most important information. In this way, the convolutional and pooling layers realize the filter-based convolution of features, abstract in their spatial dimensionality, and represent the extracted features in the form of feature maps according to their current depth in the network.

Next, as shown in block 206, the process flow includes generating a graphical representation of the first user interface based on at least initiating the GCN algorithm on the first user interface. In some embodiments, the system may be configured to embed hierarchical information associated with the object map and the field position map in the graphical representation. In one aspect, the graphical representation may include hierarchical information associated with the user elements associated with the first user interface that are represented in the form of nodes and edges. In some embodiments, each user element may be represented as a node, and the hierarchical relationship between each user element may be represented as an edge.

Next, as shown in block 208, the process flow includes transforming the graphical representation of the first user interface into one or more code blocks associated with Hypertext Mark-up Language (HTML) and/or Cascading Style Sheets (CSS). In this regard, the system may be configured to capture one or more unique features associated with the first user interface from the graphical representation of the first user interface. In some embodiments, the one or more unique features may represent the one or more user elements associated with the first user interface. In response to capturing the one or more unique features, the system may be configured to transform one or more unique features associated with the first user interface into one or more code blocks associated with HTML and/or CSS.

Next, as shown in block 210, the process flow includes loading the one or more code blocks on a cross-platform Graphical User Interface (GUI) platform logic. In one aspect, loading the one or more code blocks may include mapping the first user interface into a second user interface. In some embodiments, the cross-platform GUI platform logic may be any framework capable of generating desktop GUI applications using web technologies. In one aspect, cross-platform GUI platform logic may include one or more processes. In some embodiments, the one or more processes may include "browser" processes capable of executing the application logic, "render" processes that are capable of being launched by the browser processes, or the like. In one example, the cross-platform GUI platform logic may include Electron, a framework for creating desktop applications with emerging technologies including HTML, CSS, and/or JavaScript.

Next, as shown in block 212, the process flow includes initiating an embedding of the cross-platform GUI platform with an emulator high level language application programming interface (EHLLAPI) to emulate the first user interface by superimposing the second user interface over the first user interface. In some embodiments the EHLLAPI provides functions to access emulator "presentation space" data such as characters on the host interface (e.g., first user interface). In one aspect, the EHLLAPI also provides functions for sending keystrokes to the host (e.g., first computing device), intercepting user-entered keystrokes, querying the status of the host session, uploading and downloading files, and/or the like. In some embodiments, by embedding the cross-platform GUI platform logic with the EHLLAPI, the system may be configured to superimpose the second user interface over the first user interface.

Next, as shown in block 214, the process flow includes transmitting control signals configured to cause a second computing device to display, using the cross-platform GUI platform logic, the second user interface. In some embodiments, the system may be configured to electronically receive one or more user inputs from a user via the second user interface displayed on the second computing device. In one aspect, the one or more user inputs comprises at least keystroke input. In response, the system may be configured to convert, using the EHLLAPI, the one or more user inputs into one or more actions to be executed on the first computing device based on at least mapping the first user interface into the second user interface. Once converted, the system may then be configured to initiate an execution of the one or more actions on the first computing device.

In some embodiments, the system may be configured to continuously monitor the first user interface to detect any changes to the object map and/or the field position map. In response, the system may be configured to detect one or more changes to the object map and/or the field position map associated with the first user interface. If a change is detected, the system may be configured to initiate the GCN algorithm on the first user interface with the one or more changes to the object map and/or the field position map associated with the first user interface. In response, the system may be configured to generate an updated graphical representation of the first user interface based on at least initiating the GCN algorithm on the first user interface with the one or more changes to the object map and/or the field position map. As described herein, the system may be configured to embed hierarchical information associated with the one or more changes to the object map and/or the field position map to the graphical representation. In response to generating the graphical representation of the first user interface, the system may be configured to update the one or more code blocks based on at least the updated graphical representation of the first user interface.

In some embodiments, the system may be configured to initiate a Robotic Process Automation (RPA) engine on the second user interface associated with the second computing device. In response, the system may be configured to deploy, using the RPA engine, an application execution bot to replicate the one or more user inputs to be executed on the second user interface. In response, the system may be configured to convert, using the EHLLAPI, the one or more user inputs executed by the application execution bot on the second user interface into the one or more actions to be executed on the first computing device based on at least mapping the first user interface into the second user interface. In response, the system may be configured to initiate an execution of the one or more actions on the first computing device.

FIG. 3 illustrates a flowchart for dynamic generation of a transmission interface bridge for computing platforms 300, in accordance with an embodiment of the invention. As described herein, the first computing device may be a mainframe system. At step 302, the system retrieves the BMS map from the mainframe system 130. At step 304, the system initiates an OCR engine on the BMS map. At step 306, the OCR engine generates object maps and field position maps for the first user interface. At step 308, the system initiates a graph convolution network algorithm on the object maps and the field position maps. At step 310, the unique features extracted by the GCN are transformed into HTML/CSS code. At step 312, the HTML/CSS code is then fed into a cross-platform GUI platform such as Electron embedded with the EHLLAPI to generate the second user interface. At step 314, the system can adjust the settings of the EHLLAPI to ensure that it capable of being displayed on the user input system 140 (second user computing device).

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for system for dynamic generation of a transmission interface bridge for computing platforms, the system comprising:
    at least one non-transitory storage device; and
    at least one processing device coupled to the at least one non-transitory storage device, wherein the at least one processing device is configured to:
        electronically retrieve information associated with a first user interface associated with a first computing device;
        electronically retrieve a Basic Mapping Support (BMS) map associated with the first user interface;
        initiate an Optical Character Recognition (OCR) engine on the first user interface and the BMS map associated with the first user interface; and
        generate, using the OCR engine, an object map and a field position map for the first user interface based on at least the first user interface and the BMS map associated with the first user interface;
        initiate a Graph Convolution Network (GCN) algorithm on the first user interface;
        generate a graphical representation of the first user interface based on at least initiating the GCN algorithm on the first user interface;
        transform the graphical representation of the first user interface into one or more code blocks associated with Hypertext Mark-up Language (HTML) and/or Cascading Style Sheets (CSS);
        continuously monitor the first user interface to detect any changes to the object map and/or the field position map associated with the first user interface;
        detect one or more changes to the object map and/or the field position map associated with the first user interface;
        update the one or more code blocks in response to detecting the one or more changes to the object map and/or the field position map associated with the first user interface;
        load the one or more code blocks on a cross-platform Graphical User Interface (GUI) platform logic, wherein loading further comprises mapping the first user interface into a second user interface;
        initiate an embedding of the cross-platform GUI platform logic with an emulator high level language application programming interface (EHLLAPI) to emulate the first user interface by superimposing the second user interface over the first user interface;
        transmit control signals configured to cause a second computing device to display, using the cross-platform GUI platform logic, the second user interface;
        electronically receive at least one keystroke input from a user via the second user interface displayed on the second computing device;
        intercept, using the EHLLAPI, the at least one keystroke input;
        convert, using the EHLLAPI, the at least one keystroke input into at least one action to be executed on the first computing device; and
        initiate an execution of the at least one action on the first computing device.

2. The system of claim 1, wherein the at least one processing device is further configured to:
    initiate the GCN algorithm on the first user interface, wherein the initiating further comprises initiating the GCN algorithm on the object map and the field position map associated with the first user interface.

3. The system of claim 2, wherein the at least one processing device is further configured to:
    generate the graphical representation of the first user interface based on at least initiating the GCN algorithm on the first user interface, wherein the generating further comprises embedding hierarchical information associated with the object map and the field position map in the graphical representation.

4. The system of claim 3, wherein the at least one processing device is further configured to transform the graphical representation of the first user interface into the one or more code blocks associated with the HTML and/or CSS, wherein the transforming further comprises:
    capturing one or more unique features associated with the first user interface from the graphical representation of the first user interface; and transforming the one or more unique features associated with the first user interface into the one or more code blocks associated with the HTML and/or CSS.

5. The system of claim 1, wherein the at least one processing device is further configured to:
initiate the GCN algorithm on the first user interface with the one or more changes to the object map and/or the field position map associated with the first user interface;
generate an updated graphical representation of the first user interface based on at least initiating the GCN algorithm on the first user interface with the one or more changes to the object map and/or the field position map, wherein the generating further comprises embedding hierarchical information associated with the one or more changes to the object map and/or the field position map to the graphical representation; and
update the one or more code blocks based on at least the updated graphical representation of the first user interface.

6. The system of claim 5, wherein the at least one processing device is further configured to:
initiate a Robotic Process Automation (RPA) engine on the second user interface associated with the second computing device;
deploy, using the RPA engine, an application execution bot to replicate the at least one keystroke input to be executed on the second user interface;
convert, using the EHLLAPI, the at least one keystroke input executed by the application execution bot on the second user interface into the at least one action to be executed on the first computing device based on at least mapping the first user interface into the second user interface; and
initiate an execution of the at least one action on the first computing device.

7. A computer program product for system for dynamic generation of a transmission interface bridge for computing platforms, the computer program product comprising a non-transitory computer-readable medium comprising code causing a first apparatus to:
electronically retrieve information associated with a first user interface associated with a first computing device;
electronically retrieve a Basic Mapping Support (BMS) map associated with the first user interface;
initiate an Optical Character Recognition (OCR) engine on the first user interface and the BMS map associated with the first user interface; and
generate, using the OCR engine, an object map and a field position map for the first user interface based on at least the first user interface and the BMS map associated with the first user interface;
initiate a Graph Convolution Network (GCN) algorithm on the first user interface;
generate a graphical representation of the first user interface based on at least initiating the GCN algorithm on the first user interface;
transform the graphical representation of the first user interface into one or more code blocks associated with Hypertext Mark-up Language (HTML) and/or Cascading Style Sheets (CSS);
continuously monitor the first user interface to detect any changes to the object map and/or the field position map associated with the first user interface;
detect one or more changes to the object map and/or the field position map associated with the first user interface;
update the one or more code blocks in response to detecting the one or more changes to the object map and/or the field position map associated with the first user interface;
load the one or more code blocks on a cross-platform Graphical User Interface (GUI) platform logic, wherein loading further comprises mapping the first user interface into a second user interface;
initiate an embedding of the cross-platform GUI platform logic with an emulator high level language application programming interface (EHLLAPI) to emulate the first user interface by superimposing the second user interface over the first user interface;
transmit control signals configured to cause a second computing device to display, using the cross-platform GUI platform logic, the second user interface;
electronically receive at least one keystroke input from a user via the second user interface displayed on the second computing device;
intercept, using the EHLLAPI, the at least one keystroke input;
convert, using the EHLLAPI, the at least one keystroke input into at least one action to be executed on the first computing device; and
initiate an execution of the at least one action on the first computing device.

8. The computer program product of claim 7, wherein the first apparatus is further configured to:
initiate the GCN algorithm on the first user interface, wherein the initiating further comprises initiating the GCN algorithm on the object map and the field position map associated with the first user interface.

9. The computer program product of claim 8, wherein the first apparatus is further configured to:
generate the graphical representation of the first user interface based on at least initiating the GCN algorithm on the first user interface, wherein the generating further comprises embedding hierarchical information associated with the object map and the field position map in the graphical representation.

10. The computer program product of claim 9, wherein the first apparatus is further configured to transform the graphical representation of the first user interface into the one or more code blocks associated with the HTML and/or CSS, wherein the transforming further comprises:
capturing one or more unique features associated with the first user interface from the graphical representation of the first user interface; and
transforming the one or more unique features associated with the first user interface into the one or more code blocks associated with the HTML and/or CSS.

11. The computer program product of claim 7, wherein the first apparatus is further configured to:
initiate the GCN algorithm on the first user interface with the one or more changes to the object map and/or the field position map associated with the first user interface;
generate an updated graphical representation of the first user interface based on at least initiating the GCN algorithm on the first user interface with the one or more changes to the object map and/or the field position map, wherein the generating further comprises embedding hierarchical information associated with the one or more changes to the object map and/or the field position map to the graphical representation; and update the one or more code blocks based on at least the updated graphical representation of the first user interface.

12. The computer program product of claim 11, wherein the first apparatus is further configured to:
initiate a Robotic Process Automation (RPA) engine on the second user interface associated with the second computing device;
deploy, using the RPA engine, an application execution bot to replicate the at least one keystroke input to be executed on the second user interface;
convert, using the EHLLAPI, the at least one keystroke input executed by the application execution bot on the second user interface into the at least one action to be executed on the first computing device based on at least mapping the first user interface into the second user interface; and
initiate an execution of the at least one action on the first computing device.

13. A method for dynamic generation of a transmission interface bridge for computing platforms, the method comprising:
electronically retrieving information associated with a first user interface associated with a first computing device;
electronically retrieving a Basic Mapping Support (BMS) map associated with the first user interface;
initiating an Optical Character Recognition (OCR) engine on the first user interface and the BMS map associated with the first user interface; and
generating, using the OCR engine, an object map and a field position map for the first user interface based on at least the first user interface and the BMS map associated with the first user interface;
initiating a Graph Convolution Network (GCN) algorithm on the first user interface;
generating a graphical representation of the first user interface based on at least initiating the GCN algorithm on the first user interface;
transforming the graphical representation of the first user interface into one or more code blocks associated with Hypertext Mark-up Language (HTML) and/or Cascading Style Sheets (CSS);
continuously monitoring the first user interface to detect any changes to the object map and/or the field position map associated with the first user interface;
detecting one or more changes to the object map and/or the field position map associated with the first user interface;
updating the one or more code blocks in response to detecting the one or more changes to the object map and/or the field position map associated with the first user interface;
loading the one or more code blocks on a cross-platform Graphical User Interface (GUI) platform logic, wherein loading further comprises mapping the first user interface into a second user interface;
initiating an embedding of the cross-platform GUI platform logic with an emulator high level language application programming interface (EHLLAPI) to emulate the first user interface by superimposing the second user interface over the first user interface;
transmitting control signals configured to cause a second computing device to display, using the cross-platform GUI platform logic, the second user interface;
electronically receiving at least one keystroke input from a user via the second user interface displayed on the second computing device;
intercepting, using the EHLLAPI, the at least one keystroke input;
converting, using the EHLLAPI, the at least one keystroke input into at least one action to be executed on the first computing device; and
initiating an execution of the at least one action on the first computing device.

14. The method of claim 13, wherein the method further comprises:
initiating the GCN algorithm on the first user interface, wherein the initiating further comprises initiating the GCN algorithm on the object map and the field position map associated with the first user interface.

15. The method of claim 14, wherein the method further comprises:
generating the graphical representation of the first user interface based on at least initiating the GCN algorithm on the first user interface, wherein the generating further comprises embedding hierarchical information associated with the object map and the field position map in the graphical representation.

16. The method of claim 15, wherein the method further comprises transforming the graphical representation of the first user interface into the one or more code blocks associated with the HTML and/or CSS, wherein transforming further comprises:
capturing one or more unique features associated with the first user interface from the graphical representation of the first user interface; and
transforming the one or more unique features associated with the first user interface into the one or more code blocks associated with the HTML and/or CSS.

17. The method of claim 13, wherein the method further comprises:
initiating the GCN algorithm on the first user interface with the one or more changes to the object map and/or the field position map associated with the first user interface;
generating an updated graphical representation of the first user interface based on at least initiating the GCN algorithm on the first user interface with the one or more changes to the object map and/or the field position map, wherein the generating further comprises embedding hierarchical information associated with the one or more changes to the object map and/or the field position map to the graphical representation; and
updating the one or more code blocks based on at least the updated graphical representation of the first user interface.

18. The method of claim 17, wherein the method further comprises:
initiating a Robotic Process Automation (RPA) engine on the second user interface associated with the second computing device;
deploying, using the RPA engine, an application execution bot to replicate the at least one keystroke input to be executed on the second user interface;
converting, using the EHLLAPI, the at least one keystroke input executed by the application execution bot on the second user interface into the at least one action to be executed on the first computing device based on at least mapping the first user interface into the second user interface; and initiating an execution of the at least one action on the first computing device.

\* \* \* \* \*